May 14, 1946. D. W. CHRISTENSEN ET AL 2,400,224
MOTOR BRACKET
Filed Dec. 2, 1943 2 Sheets-Sheet 1
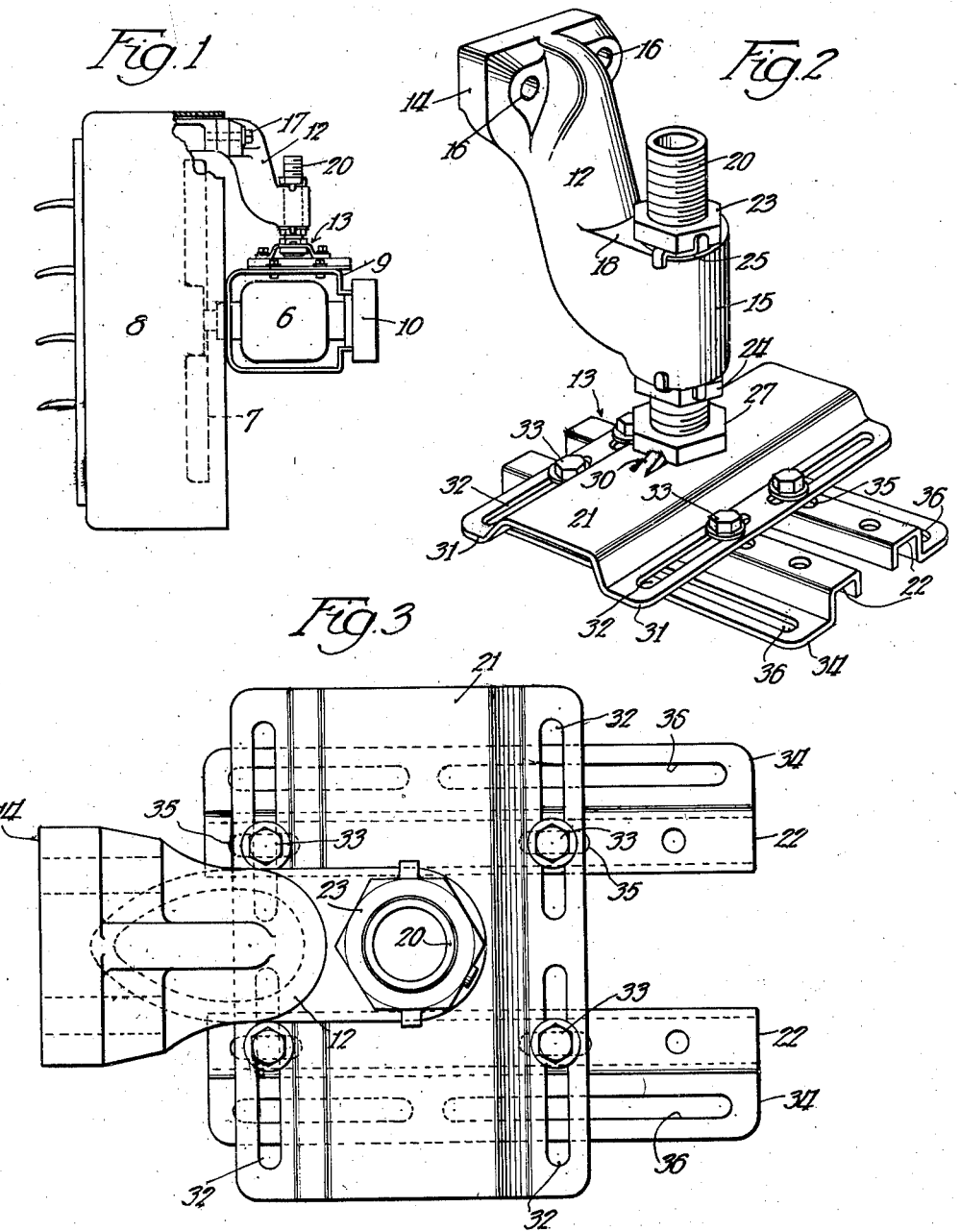
Inventors:
Donald W. Christensen
Stephen Sadlon
By Soans, Pond & Anderson Attys.

May 14, 1946.　　D. W. CHRISTENSEN ET AL　　2,400,224
MOTOR BRACKET
Filed Dec. 2, 1943　　2 Sheets-Sheet 2
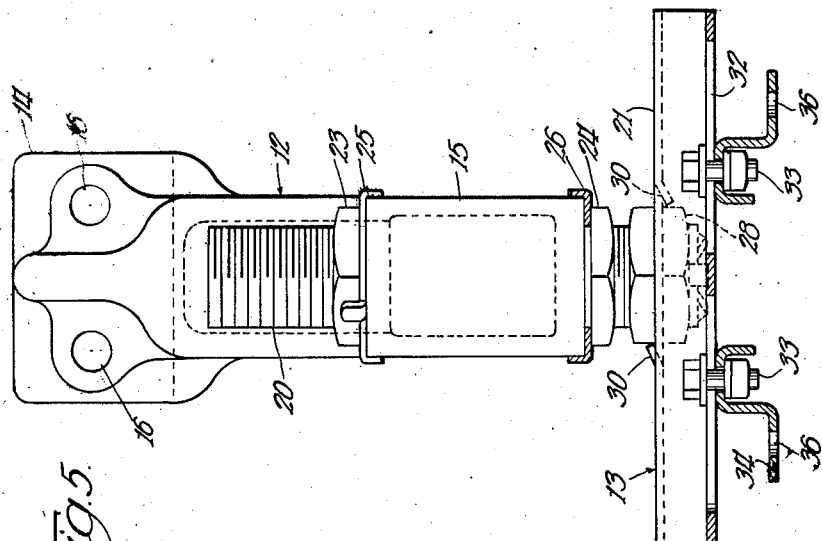
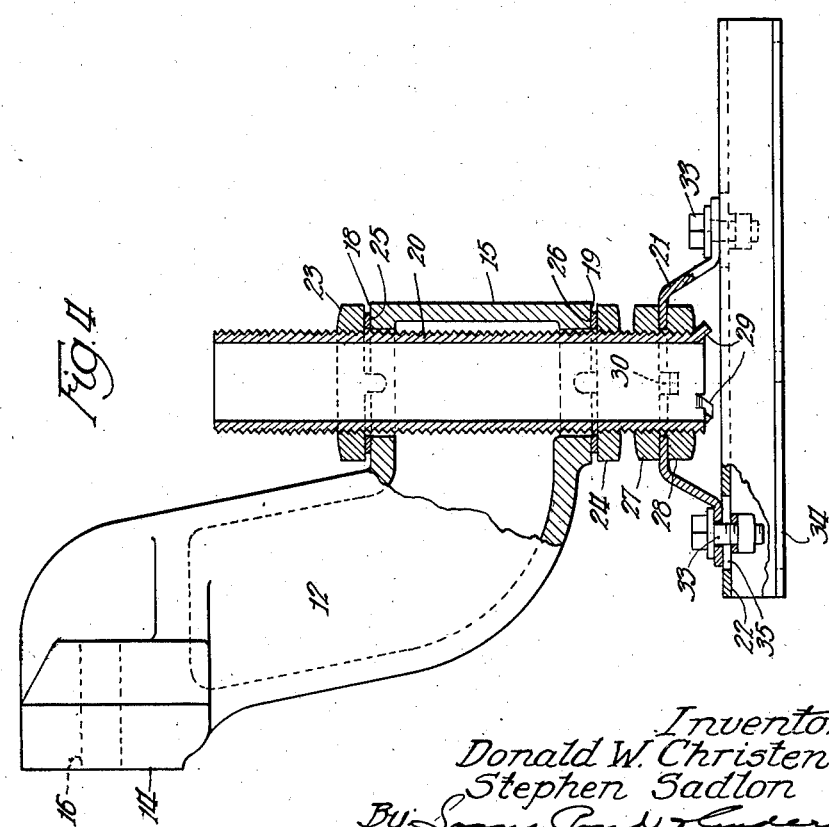
Inventors:
Donald W. Christensen
Stephen Sadlon Patented May 14, 1946

2,400,224

UNITED STATES PATENT OFFICE 2,400,224

MOTOR BRACKET

Donald W. Christensen and Stephen Sadlon, Racine, Wis., assignor to Young Radiator Company, a corporation of Wisconsin Application December 2, 1943, Serial No. 512,518

8 Claims. (Cl. 248—16)

In the mounting of motor-driven fans or blowers of various sizes for forcing air through heat exchange units, it is essential to have a suitable bracket whereby to support the blower and its fan offset from the plane of but in proper co-axial alignment with the heat exchange unit. Heat exchange units are made in various dimensions and motors, made by various manufactacturers, have to be used in connection with these heat exchange units of varying dimension. In general practice there may be as many as twelve different sizes of heat exchange units and an equal number of different models of motor construction. In any particular assembly, the motor with its fan has to be mounted at one side of the heat exchange unit with the axis of the motor and fan coincident with the axis of the heat exchange unit. This means that some form of bracket must be supplied which may be attached to the motor housing or base, or some supporting frame around the motor, and likewise attached to the frame of the heat exchange unit so as to position the motor in its proper offset axial alignment with the heat exchange unit. Heretofore, this has meant that there has had to be a stock of special brackets, one for each combination of heat exchange unit and motor. Apart from the expense of patterns and labor for making so many sizes of brackets, this has necessitated carrying in stock a large number of the varying sizes of bracket in order to be sure that any assembly of any type or model of motor and size of heat exchange unit could be promptly effected. Moreover, if in use one of these combinations were in need of servicing, no other motor, than that of the original assembly, could be used until another bracket were obtained.

The main objects of this invention, therefore, are to provide an improved form of adjustable bracket adapted for use in supporting two objects in offset co-axial alignment; to provide an improved adjustable bracket of this kind particularly suited for positioning a wide variety of sizes or models of motor with an attached fan or blower in proper functioning relationship with a wide variety of sizes or models of heat exchange unit; to provide an improved adjustable bracket of this kind designed to accommodate motors within a given power range made by various manufacturers and permit their assembling in functioning relationship with a wide size-range of heat exchange units made by another manufacturer; and to provide an improved adjustable bracket of this kind and for this purpose which is economical to manufacture, rigid in structure, and convenient to apply.

In the drawings:

Fig. 1 is a side elevation of a heat exchange unit and motor-fan assembly employing a bracket constructed in accordance with this invention; a portion of the figure is broken away to more clearly illustrate the connection of the bracket to the heat exchange frame;

Fig. 2 is a perspective view of the bracket constructed in accordance with this invention;

Fig. 3 is a plan view of the bracket;

Fig. 4 is a vertical side elevation, partly in section, of the improved form of bracket; and Fig. 5 is a rear view of the bracket, portions thereof being in cross section to more clearly indicate the arrangement of parts.

The assembly, for which a bracket constructed in accordance with the invention is designed for use, embodies a motor 6, on which is mounted a fan or blower member 7, arranged for forcing air through a heat exchange unit 8. As shown in Fig. 1, the motor and heat exchange unit are mounted in offset co-axial relationship. The motor 6 illustrated in the drawings is shown supported within a frame 9. Other types of motor have a base integrally formed on the motor housing. However, the details of the motor and its supporting element constitute no feature of this invention.

The heat exchange unit 8 may be of any suitable design. Preferably it includes a battery of finned tubes through which a fluid is circulated and around which air is forced by means of the fan 7.

A bracket constructed in accordance with this invention comprises two main members or elements 12 and 13. These members are so formed and associated that they may be variously adjusted to alter the relative positioning of the parts on each whereby they are attached to the heat exchange unit 8 and the motor 6 respectively. This adjustable relationship permits motors of varying models within a given power range to be properly positioned in offset co-axial relationship with heat exchange units likewise of varying dimensions.

The main member or element 12 of this improved bracket is preferably in the form of a casting having a base pad 14 and a hub-bearing 15. The casting in shape approximates a reversed S, thereby positioning the base pad 14 and hub-bearing 15 in the particular offset relationship essential to the purpose of this bracket. The base pad 14 is provided with holes 16 through which cap screws or bolts 17 may be inserted for securing the member 12 to the casing of the heat exchange unit 8. The hub-bearing 15 is disposed with its axis in a plane parallel to the face of the base pad which contacts the heat exchange unit frame and obviously is transverse to the axis of the motor 6. The hub 15 is bored to accommodate a tubular part on the member 13 and is provided with flattened surfaces 18 and 19 to co-act with suitable nuts on said tubular member. This offset relationship of the hub-bearing 15 and the base pad 14 locates the other bracket member 13 in proper position for its attachment to the motor 6.

The main member or element 13 comprises a tubular member 20, a main plate 21, and a pair of auxiliary bars 22.

The tubular member 20 is threaded and shiftably supported on the hub-bearing 15 of the bracket member 12. Once adjusted with regard to the hub 15, the tubular member is locked into position by means of nuts 23 and 24 between which and the flattened surfaces 18 and 19 on the hub are inserted lock washers 25 and 26. These lock washers have suitable lugs or ears which may be bent up against the nuts and down against the adjacent portion of the hub so as to secure the nuts 23 and 24 against rotation.

The plate 21 is secured to the lower end of the tubular member 20 by means of nuts 27 and 28 screwed against the plate 21 from opposite sides. Below the nut 28 the tubular member 20 has one or more lugs 29 (see Fig. 4) struck out from the end thereof. The nuts 27 and 28, once they have been firmly turned up against the plate 21, are locked into position by means of lugs 30 struck up or down, as the case may be, from an adjacent portion of the plate 21.

The plate 21 is of channel form with flanges 31 extending along its lateral edges. This channel arrangement not only provides the strength essential to a plate of this kind, but offsets the flanges 31 below the end of the tubular member 20 to permit the attachment of the bars 22. The flanges 31 are provided with elongated slots 32 through which bolts 33 extend to permit connection with the members 22 when the nuts thereon are screwed up.

The bars 22 are likewise U-shaped, each having a flange 34 along one edge. These bars 22 are provided with either slots or holes 35 for receiving the bolts 33, whereby the bars are secured to the plate 21. The flanges 34 are provided with slots 36 designed for receiving suitable bolts or cap screws to connect these parts to the frame or base 9 of the motor 6.

The operation of a bracket constructed in accordance with this invention is substantially as follows:

The channel bars 22 of the bracket member 13 are connected to the frame or base 9 of the motor 6. The nuts on the bolts 33 are loosened so as to permit ready adjustment of the bars 22 relative to the plate 21. Cap screws or bolts would be inserted through the slots 36 and secured to the motor frame or base. All of these bolt and nut connections would be left free to permit the required shifting of the several parts during the final positioning of the motor relative to the heat exchange unit. On certain motor bases or frames 9 the holes for the screws or bolts may be so close together that it becomes necessary to reverse the relationship of the bars 22 as shown in the drawings. This would place the flanges on the inside adjacent to each other.

With the bracket member 13 thus secured to the motor housing, the bracket member 12 would be adjusted axially on the tube 20 to bring the base pad 14 into proper contact with the frame of the heat exchange unit 8 so that the motor 6 would be positioned in proper offset axial alignment with the heat exchange unit 8. Once this relative position of the members 12 and 13 had been determined, the lock nuts 23 and 24 would be turned down against the washers 25 and 26 to secure the tube 20 against movement, whereupon the tongues on the washers would be turned up and down respectively against the nuts and the adjacent portions of the hub.

After the final co-axial alignment of the motor 6 and heat exchange unit 8 has been secured the final adjustment of the bars 22 on the plate 21 would be made to obtain the proper axial alignment of the motor 6 relative to the heat exchange unit 8. This having been done, the nuts on the bolts 33 may be drawn up firmly and likewise the nuts on the bolts which attach the bars 22 to the motor frame. Thereupon, the cap screws or bolts 17 may be firmly drawn up.

As will be obvious, from this description and the drawings, the adjustable arrangement of the tubular part 20 on the member 12, together with the adjustable relationship of the angle bars 22 on the member 21 and the adjustment of these angle bars with regard to the motor support, permits a very wide range of use of this bracket. So wide a range, in fact, that the bracket will accommodate the assembling of any one of a number of different models of motor 6 on heat exchange units of quite a wide range of dimensions. Not only does this make possible the assembly of various models of motor and sizes of heat exchange unit at the factory, but it makes possible, out on the field, the replacing of one model of motor with another when for any reason it is not possible to secure a motor of the exact type with which the heat exchange unit was equipped when shipped from the factory.

Variations and modifications in the details of structure and arrangement of the parts may be resorted to within the spirit and coverage of the appended claims.

We claim:

1. A bracket of the class described comprising a supporting arm having on one end a part for attachment to one of two objects to be mounted in cooperative relationship, a hub-bearing formed on the other end of said arm, a tubular member having support in said hub-bearing for axial adjustment thereon, a plate secured to the end of said tubular member, a pair of bars connected to said plate for adjustment thereon and adapted for attachment to the other of said objects, and means for locking said two members and said bars in any of their relatively adjustable positions.

2. A bracket of the class described comprising a supporting arm having on one end a part for attachment to one of two objects to be mounted in cooperative relationship, a hub-bearing formed on the other end of said arm, a tubular member having support in said hub-bearing for axial adjustment thereon, an oblong channel-shaped plate formed with a pair of lateral flanges, said flanges having slots formed therein, and a pair of flanged U-shaped bars adjustably supported on said plate by means of bolt and nut connections extending through said flange slots, said U-shaped bar flanges having slots formed therein to permit adjustable connection of said bars to the other of said objects.

3. A bracket of the class described comprising a supporting arm having on one end a part for attachment to one of two objects to be mounted in cooperative relationship, a hub-bearing formed on the other end of said arm, a tubular member having support in said hub-bearing for axial adjustment thereon, an oblong channel-shaped plate formed with a pair of lateral flanges, said flanges having slots formed therein, and a pair of flanged U-shaped bars adjustably supported on said plate on opposite sides of the axis of said tubular member by means of bolt and nut connections extending through said flange slots, said U-shaped bar flanges having slots formed therein to permit adjustable connection of said bars to the other of said objects.

4. A bracket comprising a pair of members for mounting two objects in offset co-axial alignment, one of said members approximating the form of a reversed S having a base pad on one end for attaching said member to one of said objects and a hub formed on the other end with its axis parallel to the face of said base pad, the other said member being in the form of a tube adjustably mounted in said hub and having a plate secured to the end thereof, and a pair of bars adjustably connected to said plate and adapted for attachment to the other of the said objects with the plane of attachment to said object being at right angles to the plane of attachment of said pad and its object.

5. A bracket comprising a pair of members for mounting two objects in offset co-axial alignment, one of said members approximating the form of a reversed S having a base pad on one end for attaching said member to one of said objects and a hub formed on the other end with its axis parallel to the face of said base pad, the other said member being in the form of a tube adjustably mounted in said hub and having a plate secured to the end thereof, a pair of bars adjustably connected to said plate and adapted for attachment to the other of the said objects with the plane of attachment to said object being at right angles to the plane of attachment of said pad and its object, means for locking said tubular member to said hub, and other means for locking said bars to said plate.

6. A bracket for mounting in co-axial relationship any pair of a number of different separately formed standard type motor and fan units each supported in the usual frame, said bracket comprising a pair of members one of which is formed with a pad on one end for attachment to the fan frame and a hub bearing on the other end with the axis thereof parallel with the plane of attachment of said pad on said fan frame, the other bracket member being of a tubular form and having support in said hub bearing for axial adjustment thereon, a plate secured to the end of said tubular member, and means adapted for attachment to the motor frame and connected to said plate for shifting said motor in a plane transversely to the axis of said tubular member.

7. A bracket comprising, a pair of members for mounting one object in cooperative relationship with another object, each of said pairs of members having a part adapted for attachment to the respective object and a second part connected to the respective first part, one of said members having its second part adjustably connected to its first part, and means adjustably connecting together the said second parts of said members whereby in cooperation with said relatively-adjustable first and second parts of said one member said one object may be shifted in directions perpendicular to each other in a plane parallel to the plane of the other said object.

8. A bracket for effecting the mounting in coaxial alignment of two objects of standard type either of which may vary in size or design from two similar objects, said bracket comprising, a pair of members, each of said pairs of members having a part adapted for attachment to the respective object and a second part connected to the respective first part, one of said members having its second part adjustably connected to its first part, one of said members having its said one part adapted for attachment to one of said objects on a plane normal to the axis of said objects and the other said member having its said one part adapted for attachment to the other of said objects on a plane parallel to the axis of said units, and means adjustably connecting together the second parts of said members whereby in cooperation with the adjustably-connected parts of said one member said one object may be shifted in directions perpendicular to each other in a plane parallel to the plane of the other said object.

DONALD W. CHRISTENSEN.
STEPHEN SADLON.